United States Patent
Krahbichler et al.

[11] Patent Number: 6,055,058
[45] Date of Patent: Apr. 25, 2000

[54] METHOD AND DEVICE FOR DETERMINING THE THICKNESS AND CONCENTRICITY OF A LAYER APPLIED TO A CYLINDRICAL BODY

[75] Inventors: Erik Krahbichler, Haninge; Georges Borak, Täby, both of Sweden

[73] Assignee: Telefonaktiebolaget LM Ericsson, Stockholm, Sweden

[21] Appl. No.: 08/836,223

[22] PCT Filed: Nov. 15, 1995

[86] PCT No.: PCT/SE95/01358

§ 371 Date: Aug. 12, 1997

§ 102(e) Date: Aug. 12, 1997

[87] PCT Pub. No.: WO96/16314

PCT Pub. Date: May 30, 1996

[30] Foreign Application Priority Data

Nov. 17, 1994 [SE] Sweden ................................. 9403974

[51] Int. Cl.[7] .................................................. G01B 11/06
[52] U.S. Cl. ............................................. 356/381; 356/382
[58] Field of Search ..................................... 356/381, 382

[56] References Cited

U.S. PATENT DOCUMENTS

| | | |
|---|---|---|
| 3,017,512 | 1/1962 | Wolbert . |
| 4,583,851 | 4/1986 | Yataki . |
| 4,984,894 | 1/1991 | Kondo ..................................... 356/381 |
| 5,208,645 | 5/1993 | Inoue et al. . |
| 5,216,486 | 6/1993 | Sullerot et al. . |
| 5,570,446 | 10/1996 | Zheng et al. . |
| 5,572,313 | 11/1996 | Zheng et al. . |

FOREIGN PATENT DOCUMENTS

| | | |
|---|---|---|
| 443 322 | 8/1991 | European Pat. Off. . |
| 63-274804 | 11/1988 | Japan . |
| 63-286738 | 11/1988 | Japan . |
| 4-363612 | 12/1992 | Japan . |
| 5-79821 | 3/1993 | Japan . |
| 5-288517 | 11/1993 | Japan . |
| 2 170 598 | 8/1986 | United Kingdom . |

Primary Examiner—Robert H. Kim

[57] ABSTRACT

In the determination of deviation from a concentric position for a protective polyimide coating disposed on an optical fiber, the absorption of light in the coating is used. A light source such as a laser provides a light ray which is split by a beamsplitter in two light rays. By suitably placed mirrors, the light rays are guided to hit two opposite sides of the fiber at oblique and equal incidence angles to the longitudinal direction of the fiber. The light rays hit the fibers at positions which are a little displaced in the longitudinal direction of the fiber in order to prevent wrong light rays from hitting the detectors which receive the reflected light. The detectors provide signals representing the intensity of the reflected light to a subtraction circuit which forms the difference of the signals from the detectors. The different signal is then a measure of the concentricity error of the coating. A simple method and device are obtained in this way which can also be used on-line in the determination of concentricity in the case where the coating is extruded in a drawing tower where the fiber is produced. Absolute determinations of the thickness of a coating can also be made by making a measurement on a fiber having a calibrated coating.

6 Claims, 3 Drawing Sheets

METHOD AND DEVICE FOR DETERMINING THE THICKNESS AND CONCENTRICITY OF A LAYER APPLIED TO A CYLINDRICAL BODY

The present invention relates to determination of the thickness and in particular of the concentricity of the coating or jacket of an optical fiber, more particularly the deviation from a concentric position for a coating, in particular a thin plastics coating, on an optical fiber.

BACKGROUND

Conventional optical fibers comprise generally a cladding, usually of quartz (silica) glass, which is protected mechanically by a layer of a plastic forming a coating or jacket, most often of polyacrylate plastic, having a typical thickness of 60–65 $\mu$m. For monitoring the concentricity of such protective coatings in the manufacture of an optical fiber most frequently an optical method is used, which uses scattering patterns, fringes, in the forward direction. However, this method does not work for fibers, which are coated with a thin layer of polyimide having a thickness of the order of magnitude of 20 $\mu$m. This results from the different optical characteristics of such a thin polyimide layer, partly derived from the reduced thickness thereof, partly from the fact that polyimide materials have substantially larger refractive indices, compared to the conventional polyacrylate materials.

In U.S. Pat. No. 5,208,645, which corresponds to the published European patent application EP-A2 0 443 322, a method and a device are disclosed for optical detection of the thickness of the coatings of cylindrical objects, such as coatings on optical fibers. A fiber is irradiated with light, the intensity or energy of which is measured after a reflection by means of a photodetector. The intensity is a measure of the thickness of the coating. This document is especially focused on measurements on optical fibers coated with carbon. Two principles are described. In one, the fiber is illuminated with parallel beams orthogonally in relation to the longitudinal direction of the fiber, the reflected radiation is detected with an image detector and the thickness of the coating is finally determined from the peak levels of the intensity of light condensed by the lens effect of the fiber portion (column 2, lines 22–34). In the other method the intensity of reflected light is measured and compared to a calibration curve in order to obtain a measure of the thickness of the coating (column 3, lines 31–51 and the description of FIGS. 4a–4c).

In the published Japanese patent application JP-A 4-363612 methods similar to that described in the document discussed above are disclosed. The thickness of a coating of an optical fiber is determined by illuminating the fiber from the side and then measuring the intensity of light, which has passed through the fiber. Possibly the intensity of reflected light is also measured. The thickness of the coating is then determined by comparing the intensity of the light that has passed through, or possibly the intensity of the reflected light, to a calibration curve.

In determining the position of the coating according to U.S. Pat. No. 4,583,851 a fiber is illuminated from the side thereof and the reflected light intensity is measured in relation to the output angle. Any deviation from the symmetry of a given profile indicates an eccentric position. A light source 10 illuminates an optical fiber 12 and the intensity of the reflected light as a function of the detection angle is detected by means of a converging lens 14, an rotating mirror 16, a slit aperture 20 and a photodetector 18.

In the published Japanese patent application JP-A 63-274804 determination of the diameter of the core and the thickness of the coating of an optical fiber are determined by projecting two light beams having different wave lengths at right angles towards and through a fiber and measuring the absorption of the light beams. The principle is that one can get an estimation of the diameter of the core and the thickness of the coating from knowledge of the different absorption coefficients of the core and the coating and the measured intensity of the light which has been reflected and the measured intensity of the light which has passed through the fiber respectively. The method disclosed in the published Japanese patent application JP-A 15 63-286738 has a great similarity to this measurement procedure. The large difference seems to be that here only one light beam is used instead of two beams.

In U.S. Pat. No. 5,216,486 a device for detecting diameter deviations of preferably optical fibers is disclosed. A monochromatic light source is used and by means of lenses and prisms the light is divided in two beams which are detected by detectors D1 and D2. They generate two voltages V1 and V2, which are subtracted from each other. When the difference V1−V2 or V1−V2 is not equal to zero, an error has been detected (column 3, lines 50–62). In the published Japanese patent application JP-A 5-079821 (application No. 3-243284) measurement of the thickness of the coating on carbon coated optical fibers is described, in which the measurement uses probably absorption of a light beam passing through the fiber.

In the published Japanese patent application JP-A 5-288517 measurement of the thickness of a coating is described, in which an optical fiber, consisting of a glass portion 100a and a plastics coating 100b, is irradiated with either X-rays or ultra violet radiation, whereafter the intensity of light passing through the fiber is measured, processed and reproduced in order to form an estimate of the thickness of the coating (see FIGS. 2 and 3). The intensity is said to depend generally only on the absorption of the fiber core and the coating and not be materially affected by refraction.

In U.S. Pat. No. 3,017,512 determination of the thickness of a thin film on an object is described. Here a reference beam of infrared light having a wave length which is not absorbed by the coating and a test beam of infrared light having a wave length, which can be partly absorbed by the coating, are used. According to the formula in column 2 it is possible to calculate, having knowledge of the intensity of the mentioned beams after reflection, the thickness of the coating of the film. A measurement device is shown in FIG. 1, in which polychromatic infrared light is generated at 11, the light being divided, by means of a chopper 12 (see FIG. 2), mirrors and optical filters 28 and 29, in a reference ray 20 and a measurement ray 21, the intensities of which are measured by means of a detector 31 and amplified. In FIG. 3 another embodiment is shown, in which separate light sources 40 and 41 are provided making the use of a chopper 12 not necessary.

SUMMARY

It is an object of the invention to provide a reliable concentricity measurement for an optical fiber having a thin coating, in particular of polyimide.

It is a further object of the invention to provide a determination of concentricity deviations directly in the manufacturing process comprising drawing of the fiber.

These objects are achieved by the invention, the characteristics and features of which appear from the appended claims.

The concentricity measurement comprises briefly that a light ray is directed towards the coated optical fiber from a side of the fiber, this light ray being partly reflected by and partly absorbed by the coating and of the interior, actual light wave-guiding part of the fiber. The thicker coating, the more light is absorbed by the coating. The absorption of light is proportional to the thickness of the coating. By detecting the reflected intensity of the light the thickness of the coating can be determined.

A device for making the concentricity measurement comprises generally a light source, preferably a laser, and a photodetector. By means thereof the thickness of the coating can be detected. In addition, if the light is divided in two light rays by means of a beamsplitter and suitable mirrors, and two photodetectors are used for detecting the reflected intensity of the light on each side of the fiber and the intensities or the signals from the photodetectors are subtracted, the concentricity of the fiber coating can be determined.

In the measurement it is assumed that:

the light is not directed across or orthogonally to the longitudinal direction of the fiber, but in some angle thereto which for instance is essentially 45° and generally is not close to 90° in relation to the fiber direction, the intensity of the reflected light is measured and linked to the thickness of the coating, the determination of the concentricity of the fiber is carried out by a subtraction of the thicknesses of the coating as measured from two directions.

Thus generally, the thickness of a layer applied on a cylindrical body is determined by illuminating the cylindrical body with a light ray having an oblique or inclined incident angle in relation to the longitudinal direction of the cylindrical body and detecting light reflected in one direction. The incident angle can be in the range of 15°–75° and is preferably essentially 45°. Furthermore, the direction in which the reflected light is detected is advantageously located in the plane, that passes through the incident light ray and through the longitudinal axis of the fiber, and which forms the same angle to the longitudinal axis of the body as the incident light beam. This method can also be described such as that a reflection in the longitudinal direction of the fiber is used. Such a measurement provides a relative thickness determination. An absolute thickness determination is obtained by a calibration measurement for a body having a known applied layer.

In particular the deviation from a concentric position for a layer applied to a cylindrical body can be determined. Two sides, preferably diametrically opposite sides, of the cylindrical body are illuminated with light rays having the same inclined incident angle to the longitudinal direction of the cylindrical body. The light reflected by the sides is detected for forming signals and the difference of the signals is formed. The incident angles can as above be in the range of 15°–75° and preferably essentially 45°.

In order to avoid the influence of an incident light ray on the reflected ray, which originates from the other incident light ray, and in order to provide a simple measurement arrangement the light rays can be reflected at areas on the cylindrical body which are located at a distance from each other in the longitudinal direction of the fiber.

In corresponding measurement devices there are at least one light source for emitting a light ray and different light ray guiding means for illuminating the cylindrical body with light rays having a desired incident angle. The ray guiding means can comprise mirrors and if required, one or several beamsplitters. Furthermore, detector means are provided for detecting light reflected by the fiber in order to provide corresponding signals. A concentricity determination subtraction means are used for form difference of the signals.

BRIEF DESCRIPTION OF THE DRAWINGS

The invention will now be described in more detail by means of non limiting embodiments and with reference to the accompanying drawings, in which.

DETAILED DESCRIPTION

Figure 1:
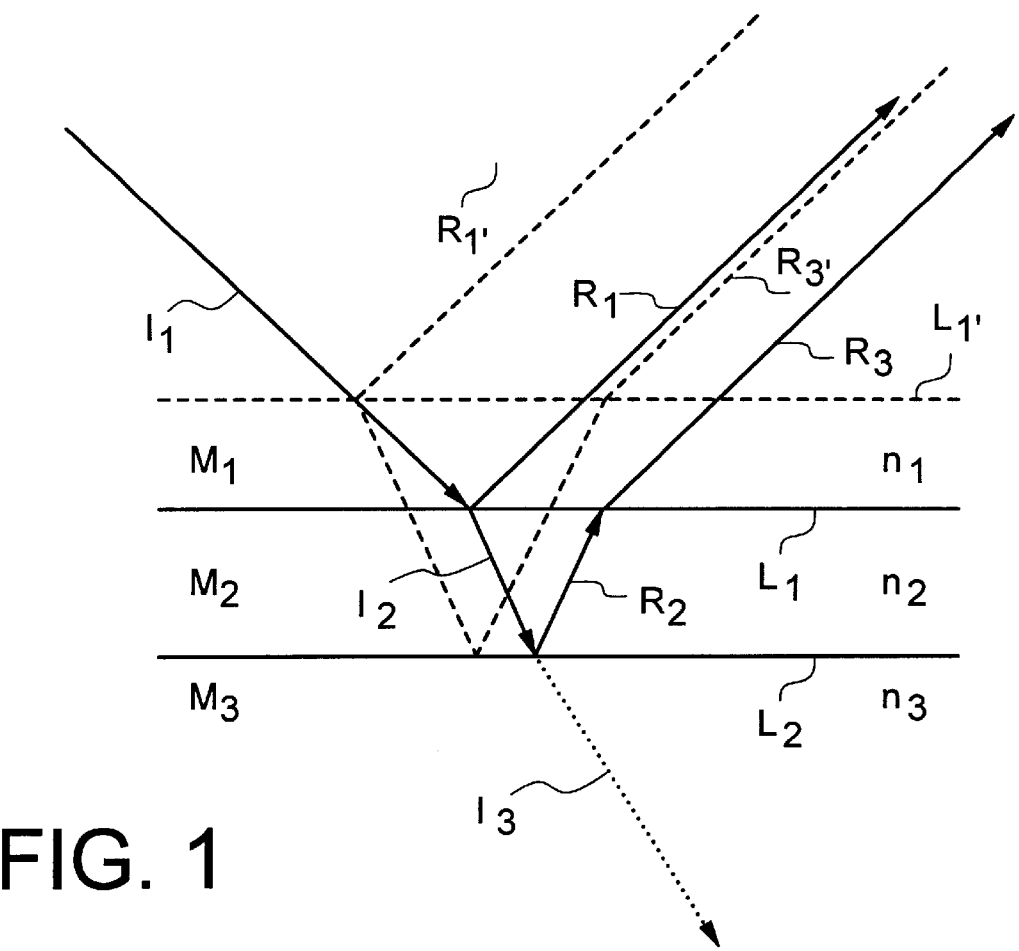
FIG. 1 is a schematic side view illustrating absorption of a light ray in reflection in a layer on a surface.

When a light ray $I_1$ from a first medium $M_1$ having a refractive index $n_1$ such as the ambient air, see FIG. 1, is incident to a boundary surface $L_1$ of another, second medium $M_2$ having a different refractive index $n_2$, the light ray $I_1$ is refracted at the boundary surface $L_1$ into a refracted ray $I_2$. A reflection of the incident light ray $I_1$ is also obtained at the boundary surface $L_1$ and provides a first reflected ray $R_1$. If the second medium $M_2$ is a layer, which is applied on top of a third medium $M_3$ having a different refractive index $n_3$, a second boundary surface $L_2$ being located therebetween, a reflection of the refracted ray $I_2$ is obtained at this second boundary surface $L_2$ and provides a second reflected ray $R_2$ in the second medium $M_2$. This reflected ray $R_2$ passes then again and is refracted at the first boundary surface $L_1$ into the first medium $M_1$ and then provides a refracted ray $R_3$, which extends in parallel to the first reflected ray $R_1$, if the boundary surfaces $L_1$ and $L_2$ are parallel. Also a third refracted ray $I_3$ can be obtained at the incidence of the first refracted ray $I_2$ to the second boundary surface $L_2$ and it then passes into the third medium $M_2$. If the second medium $M_2$ has a considerable absorption of the light used, the first refracted ray $I_2$ and the second reflected ray $R_2$, which pass in this second medium $M_2$, will be partly absorbed in the second medium $M_2$, this absorption being dependent on the path lengths of the rays in the second medium $M_2$ and thereby of the thickness of the second medium $M_2$. In the case considered here, the first medium $M_1$ is ambient air and the second medium $M_2$ is a thin coating of plastics on the cylindrical cladding of an optical fiber, the cladding forming the third medium $M_3$ and being made of quartz glass. For some plastics types, such as polyimide, absorption of light for some wave lengths can be large, the absorption being small in particular in the ambient air, and also in the quartz portion of the fiber.

Figure 2:
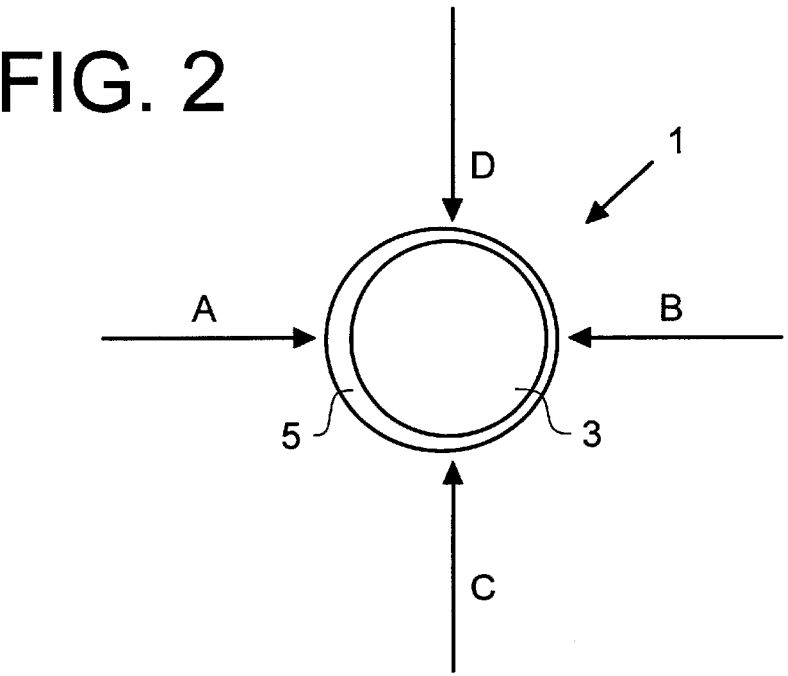
FIG. 2 is a cross-sectional view of an optical fiber coated with a plastics layer.

A cross-section of an optical fiber is schematically shown in FIG. 2 where the optical fiber is generally referenced 1.

It comprises a cylindrical portion 3, usually made of quartz glass, the outer part of which is the cladding, not especially indicated, and a surrounding coating or jacket 5. The coating 5 has also an exterior cylindrical surface and it is often located eccentrically in relation to the quartz glass portion 3 of the fiber, as is indicated in the figure. The large eccentricity which is commonly present depends on difficulties in producing the coating. A coating of polyimide film can hence typically have a thickness of approximately 10 μm, the outer diameter of the inner part 3 being approximately 125 μm. Furthermore, the adjustment accuracy of a nozzle by means of which the polyimide layer is applied in the manufacture of the fiber can normally be approximately 5 μm, due to instability of mechanical components etc., which produces then a concentricity error of the order of magnitude of 5 μm, that is approximately 50% of the thickness of the layer applied. In practical use even larger errors can occur.

Figure 3:
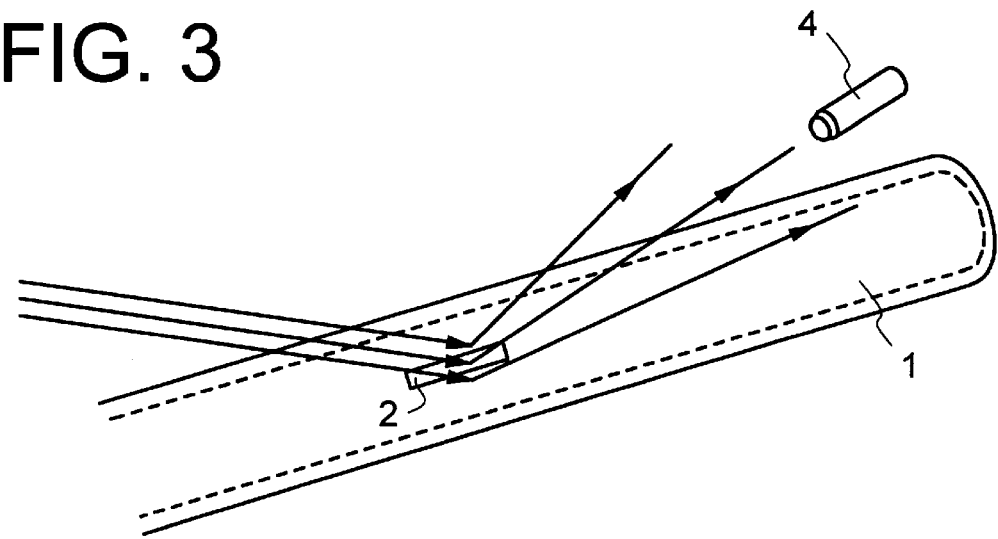
FIG. 3 is a schematic perspective view illustrating the beam paths when a light beam is reflected and detected, the light beam hitting a fiber in an oblique angle in relation to the longitudinal axis thereof.
Figure 4:
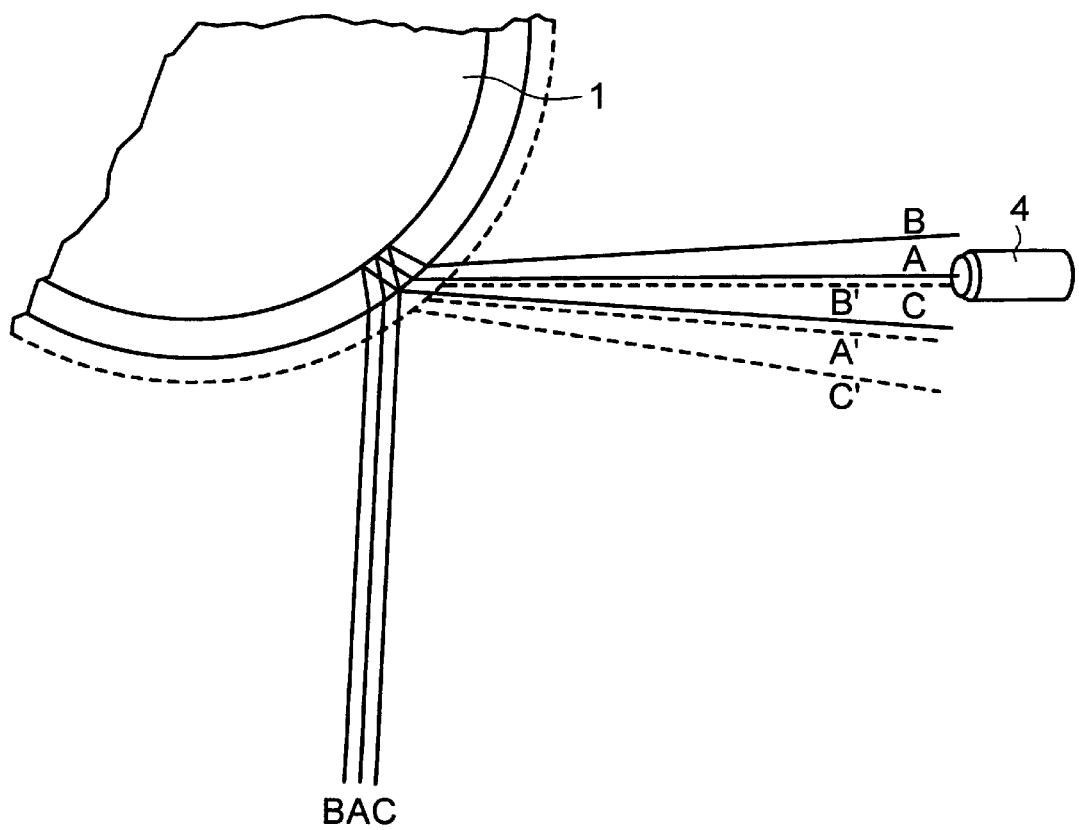
FIG. 4 is a schematic cross-sectional view illustrating the beam paths when a light beam is reflection, the light beam hitting a fiber in a right angle in relation to the longitudinal axis thereof, and when rays deflected in right angles are detected, the rays being both refracted and reflected.

In FIGS. 3 and 4 different possible beam paths are illustrated when light absorption of a refracted and reflected ray according to what has been described above is used for measurements of an optical fiber 1. Hence, in FIG. 3 a case is shown where an incident light beam is located in a plane passing through the longitudinal axis of the fiber 1 and where furthermore the beam forms an inclined angle to this longitudinal axis, typically of the order of magnitude of 45°, but generally angles in the range between 15° and 75° can be possibly used. The light beam is reflected and only rays reflected at a narrow area 2 at the surface of the fiber can be detected by a detector 4. The area 2 can have a considerable length in the longitudinal direction of the fiber but is very short or narrow, as seen in the circumferential direction of the fiber 1. Rays of the incident beam, which do not hit the area 2, are reflected to the sides, away from the plane passing through the light beam and the longitudinal axis of the fiber and do not affect the detector 4.

When using a light beam which is incident perpendicularly to the longitudinal axis of the fiber 1, a situation is obtained which is illustrated in FIG. 4. Here the beam is incident so that it is reflected in a right angle in relation to the incidence direction. A central ray A of the beam then hits a detector 4. However, if the thickness of the coating 5 is larger, as is indicated by the dashed line, the central ray A of the beam will no longer be reflected and deflected in a right angle, but in a smaller angle such as shown by the ray A'. This means that the central ray A' passes outside the detector 4, at least if it is located at not a too small distance from the fiber 1, say at a distance larger than some fiber diameter. Instead a ray B located at the side thereof in the beam will be deflected and hit the detector. However, this ray has most often a lower intensity than the central ray, so that the intensity measured by the detector 4 for one thickness of the coating cannot be related to the light intensity which is measured for a thinner coating. This measurement method could hence only be used for a measurement having the detector 4 located quite adjacent to the fiber 1 or for measurement of only very small thickness variations.

Instead, when a light beam is used passing in an angle in relation to the longitudinal direction of the fiber according to FIG. 3 only a small parallel lateral displacement of the reflected beam is obtained for a varying thickness of the coating layer. This is shown in FIG. 1, where a boundary surface $L_1'$, shown in a dashed line, is located between the first medium $M_1$ and a thicker layer of a second medium $M_2$. The ray $R_1'$ reflected at this boundary surface $L_1'$ is displaced laterally somewhat more than the ray $R_3'$, resulting from the refraction at the transition from the first medium $M_1$ to the second medium $M_2$, the reflection at the boundary surface $L_2$ between the second medium $M_2$ and the third medium $M_3$ and refraction at the transition from the second medium $M_2$ to the first medium $M_1$. The magnitudes of the parallel displacements are of the same order of magnitude as the thickness variations of the layer of the second medium $M_2$. The reflected rays will hence only be able to be reflected by the same detector supposing that this does not have a very small active surface or opening, which is always fulfilled in practical cases.

Figure 5:
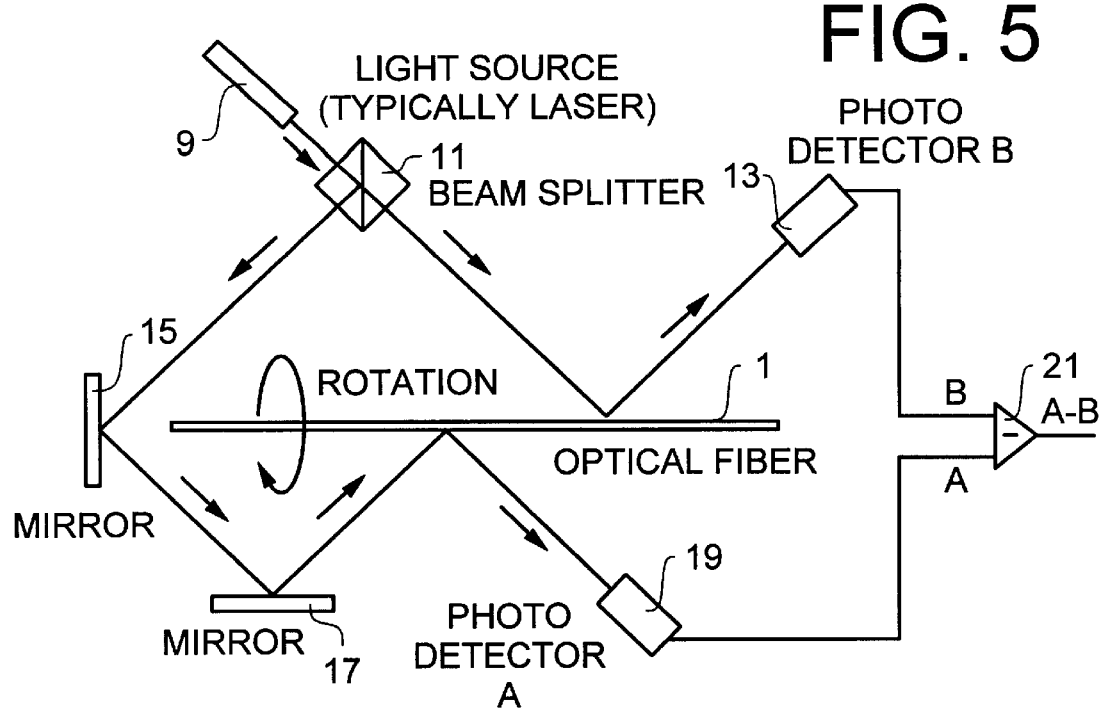
FIG. 5 is a schematic view showing a device for measurement of concentricity errors of a coating on an optical fiber.

In FIG. 5 a device is shown which uses the effect described above, that absorption of light of a suitable wave length is dependent on the thickness of an applied layer and which is constructed for the preferred, advantageous beam path which is shown in principle in FIG. 3. In the device the absorption effect is used for determining the deviation from a concentric position for an outer layer applied to an inner cylindrical part. A light beam is generated by a suitable light source such a laser 9, for instance a HeNe-laser, and the light beam is divided in two rays by a beamsplitter 11, so that one light ray passes straight through the beamsplitter 9 and a second ray is deflected therefrom in a perpendicular direction. The first light ray hits a side of an optical fiber 1 and is reflected by this to a photodetector 13. The second light ray from the beamsplitter 11 is reflected by suitably located mirrors 15, 17 in order to hit the opposite side of the optical fiber 1 and in the same incident angle as the first ray. The mirrors 15 and 17 are arranged so that they provide a light ray, which passes in parallel to the second output ray from the beamsplitter 11 but in a direction opposite thereto, that is the mirrors 15 and 17 provide a change of direction of 180°. The light ray which is reflected by the opposite side of the optical fiber 1 hits a photodetector 15. The output signals from the photodetectors 13, 19 are supplied to a subtraction circuit 21 for forming a difference signal at the output terminal thereof.

Opposite sides of the fiber 1 are such areas of the outer surface of the fiber, that a plane through the centres of the areas and in parallel to the longitudinal axis of the fiber 1 also passes through the centre axis of the fiber and that the areas are located at different intersectional lines of this plane with the outer surface of the fiber.

For a complete measurement of concentricity errors two devices according to FIG. 5 are required, which are arranged in a right angle to each other. Intensities of light rays are then detected which are reflected at areas located at an angular distance of 90° from each other, compare the rays A, B, C and D in FIG. 2. Optimally a concentricity measurement would require three light rays, which are reflected at areas located at angular distances of 120° from each other, in the circumferential direction of the fiber. This would require one additional beamsplitter in the device according to FIG. 5, additional and suitably located mirrors and yet another detector. Such an arrangement could be advantageous for measurements on a fiber during the drawing thereof, when it passes vertically downwards in a drawing tower. In such a case also the areas, at which the light rays have been reflected to the surface of the fiber, can be located in the same transverse plane or cross-section of the fiber, since the light rays which have travelled past or outside thle fiber in this geometry cannot hit any detector.

The two light rays, which are reflected by the opposite sides of the optical fiber 1 as illustrated in FIG. 5, hit the surface of the fiber at locations, which are located at a distance from each other as seen in the longitudinal direction of the fiber. Thus these locations are not diametrically opposite. If the hit areas of the rays were located at the same cross-section of the fiber 1 or near such a location, such light from every light ray, which after passing the fiber 1, for instance light which simply passes outside it, would pass also into the wrong detector 13, 19 and interfere with the measurement. The difference between the locations for the hit areas of the rays at the fiber should be such that the distance between the hit areas as seen in the direction of an incident ray shall exceed the width of the used light rays and preferably be at least a few times larger than this width.

The angle, at which the light beams hit the surface of the fiber, is further inclined in relation to the longitudinal direction of the fiber 1, the angle comprising in the preferred case approximately 45°. The angle can be chosen differently for different material combinations of layers and inner cylindrical portion, but is mostly within the range of 15–75°.

Important construction parameters are that the detectors 13 and 19 are placed with a high degree of symmetry in relation to the axis of the fiber, so that the angle, at which the light rays from the laser 9 hit the surface of the fiber 1, where the light rays are reflected, must be exactly the same for the rays on the two opposite sides of the fiber. Moreover, the distance from each detector 13, 19 to the location on the fiber, where their respective light rays are reflected, must be equal to each other. Finally the two photodetectors 13 and 19 must of course have the same sensitivity.

For measuring the difference of the absorptions according to the above in the concentricity measurement, a ray reflected by the fiber is used, the variable part of which originates from the reflection in the boundary surface between the thin coating and the cylindrical inner part.

The reflection at the boundary surface ($L_1$, see FIG. 1) between air and the thin layer is essentially independent of the concentric position of the coating, as long as the outer diameter of the coating is constant and the coating consists of the same material. Some reflection must also occur in the second boundary surface $L_2$ between the thin layer and the inner cylindrical part. This is normally also the case for plastics coatings of polyimide type. For the used wave length an intensity of the reflective ray $R_3$ is achieved for such coatings, which is in the range of 8–10% of the intensity of the ray $R_1$ reflected in the outer boundary surface, so that the variable part of the intensity, which is to be detected, then constitutes 8–10%, whereas the variations in this variable part are of course still much smaller, but still possible to detect. Conventional coatings of polyacrylate have refractive indices, which do not differ very much from the refractive index of the inner portion made of quartz glass, so that a very small reflection is obtained at the interior boundary surface, making the device less suitable for fibers coated with polyacrylate.

Figure 6:
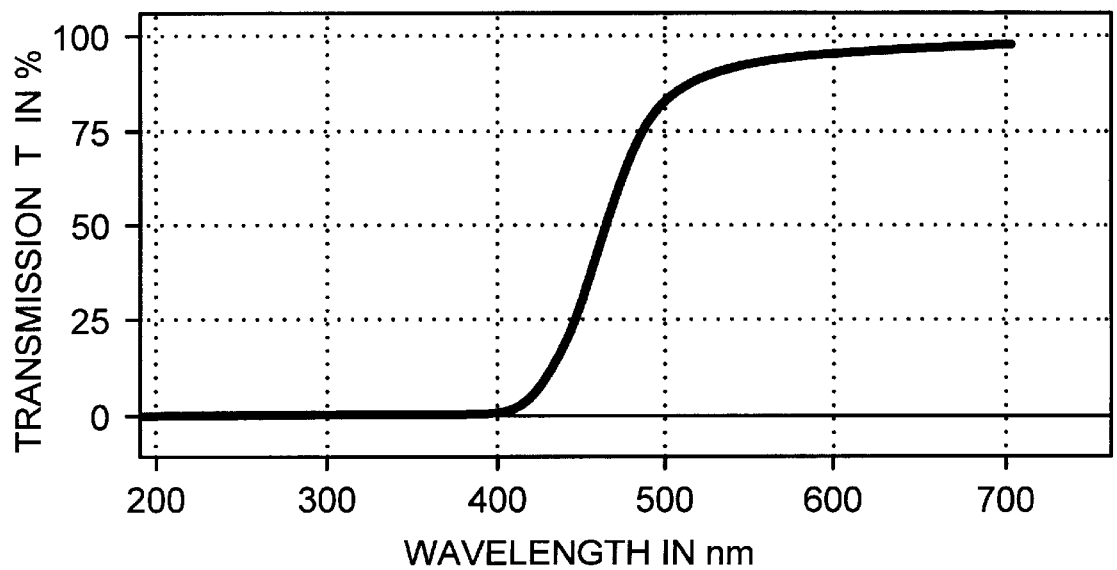
FIG. 6 is a diagram of the transmission of a polyimide layer.

Furthermore, the thin layer must be transparent to and shall present a considerable absorption for the used light wave length, which can often be obtained by a choice of a suitable light source. A diagram of the light transmission for different wave lengths for a polyimide layer is shown in FIG. 6. From this diagram it appears that light of visible wave lengths has absorption in polyimide, the absorption being quite small for long wave lengths and total for short wave, high energy light. A light wave length in this range, where the transmission is approximately 50%, would be advantageously used. However, the method also works well for light from a helium neon laser according to above, which emits light having a wave length of approximately 600 $\mu$m, where the transmission is approximately 90%.

When the light of the incident beam is coherent, interference effects of the rays which are reflected at the outer and at the inner boundary surface can be obtained. This effect is generally disturbing and is treated as noise in signal processing. It can therefore be advantageous to use non-coherent light.

A calibration of the device according to FIG. 5 can be performed by using a fiber having an accurately concentric coating that has a known thickness and is the same polymer material as the fiber for which a measurement is to be made. The use of such a calibration fiber can also provide an absolute measurement of the thickness of the layer within each area of the type that is shown at 2 in FIG. 3.

The measurement device shown in FIG. 5 could be modified so that the areas where the light rays are reflected are located opposite to each other at diametrically located locations on the surface of the fiber, provided that suitable chopper devices are arranged in the beam path, so that only one light ray is active at each moment. This would also provide the advantage that an adjustment to equal intensities could be made for the two rays for the case where the fiber is removed, since the rays then pass straightforward to the second detector. Furthermore, there must then be an adjustable filter in at least one of the beam paths, which is also advantageous for the device shown in FIG. 5. Such modifications can however complicate the device and make it more expensive.

What is claimed is:

1. A method of determining the deviation from a concentric position of a layer applied to a cylindrical body, comprising the steps of:

illuminating two different sides of the cylindrical body with light rays having the same incident angle to the longitudinal direction of the cylindrical body, detecting light reflected by the sides for forming signals, and forming the difference of these signals.

2. A method according to claim 1, wherein the incident angles are inclined and are in the range of 15°–75°.

3. A method according to claim 1, wherein the light beams are reflected at areas on the cylindrical body, which are located at a distance from each other, as taken in the longitudinal direction of the cylindrical body.

4. A device for determining deviation from a concentric position of a layer applied to a cylindrical body, comprising:

a light source for emitting a light beam, light ray guiding means for illuminating two different sides of the cylindrical body with light rays having equal incident angles to the longitudinal direction of the cylindrical body, detector means for detecting light reflected by the sides and for generating signals representing this light, subtraction means for forming the difference of these signals.

5. A device according to claim 4, wherein the light ray guiding means are arranged so that the equal incident angles are oblique and are in the range of 15°–75°.

6. A device according to claim 4, wherein the light ray guiding means comprises a beamsplitter and mirrors.

* * * * *